3 Sheets--Sheet 1.

GEORGE WESTINGHOUSE, Jr.

Improvement in Steam Air Brakes.

No. 124,405.                    Patented March 5, 1872.

Witnesses:
R. C. Wrenshall
James I. Kay

Inventor:
George Westinghouse Jr.
by Bakewell, Christy & Kerr,
his Atty's.

AM. PHOTO-LITHOGRAPHIC CO. N.Y. (OSBORNE'S PROCESS.)

3 Sheets--Sheet 2.
GEORGE WESTINGHOUSE, Jr.
Improvement in Steam Air Brakes.
No. 124,405. Patented March 5, 1872.
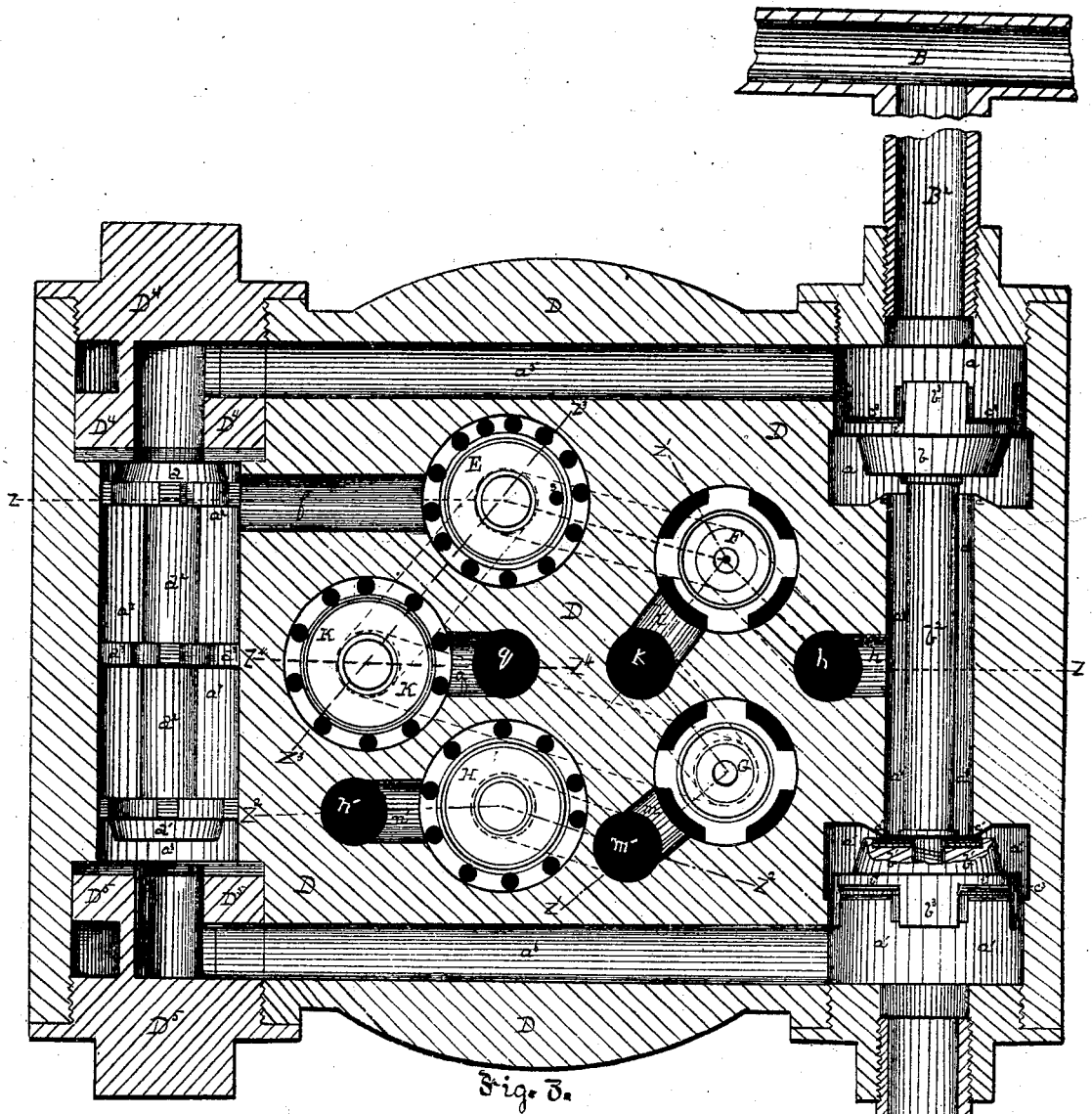
Fig. 3.
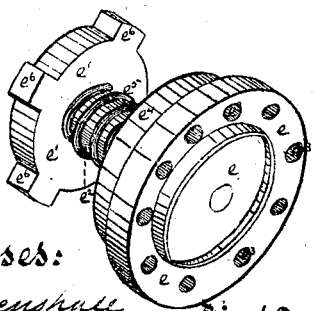
Fig. 10.
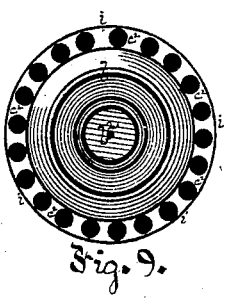
Fig. 9.
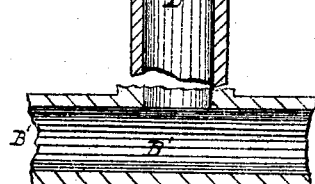
Witnesses:
R. C. Trenshall
James I. Kay
Inventor:
George Westinghouse Jr.
by Bakewell, Christy & Kerr,
his Att'ys.

GEORGE WESTINGHOUSE, Jr.
Improvement in Steam Air Brakes.

No. 124,405. Patented March 5, 1872.

Witnesses:
R. C. Wrenshall
James I. Kay

Inventor:
George Westinghouse Jr.
by Bakewell, Christy & Kerr,
his Attys.

124,405

UNITED STATES PATENT OFFICE.

GEORGE WESTINGHOUSE, JR., OF PITTSBURG, PENNSYLVANIA.

IMPROVEMENT IN STEAM AIR-BRAKES.

Specification forming part of Letters Patent No. 124,405, dated March 5, 1872.

SPECIFICATION.

*To all whom it may concern:*

Be it known that I, GEORGE WESTINGHOUSE, Jr., of Pittsburg, in the county of Allegheny and State of Pennsylvania, have invented a new and useful Improvement in Steam-Power Air-Brakes; and I do hereby declare the following to be a full, clear, and exact description thereof, reference being had to the accompanying drawing, in three sheets, making a part of this specification, in which—

Figure 1:
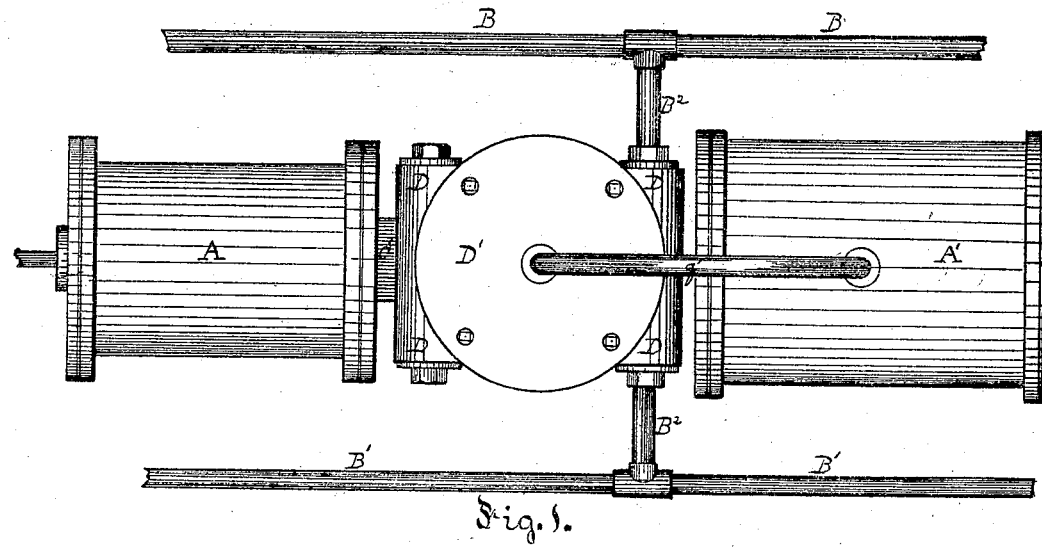
Figure 2:
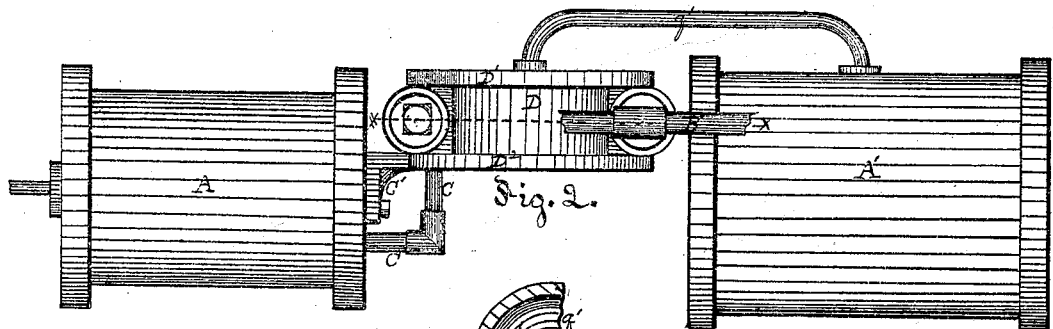
Figure 3:
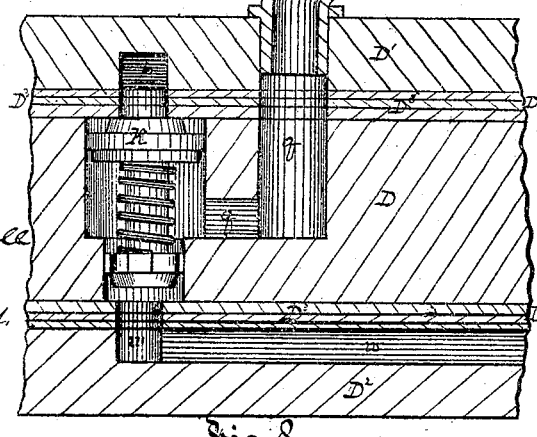
Figure 4:
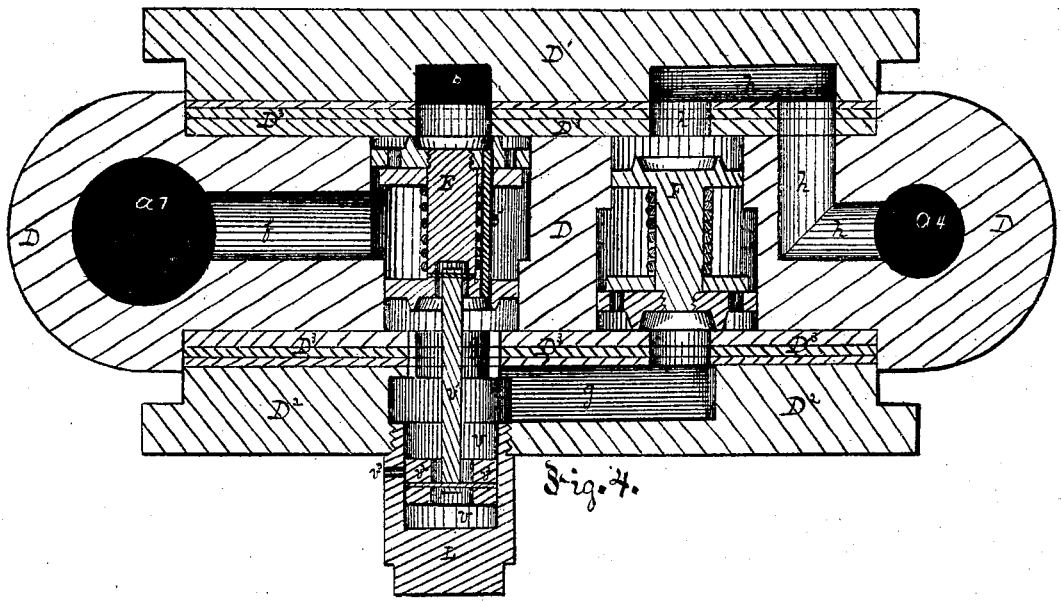
Figures 5, 6:
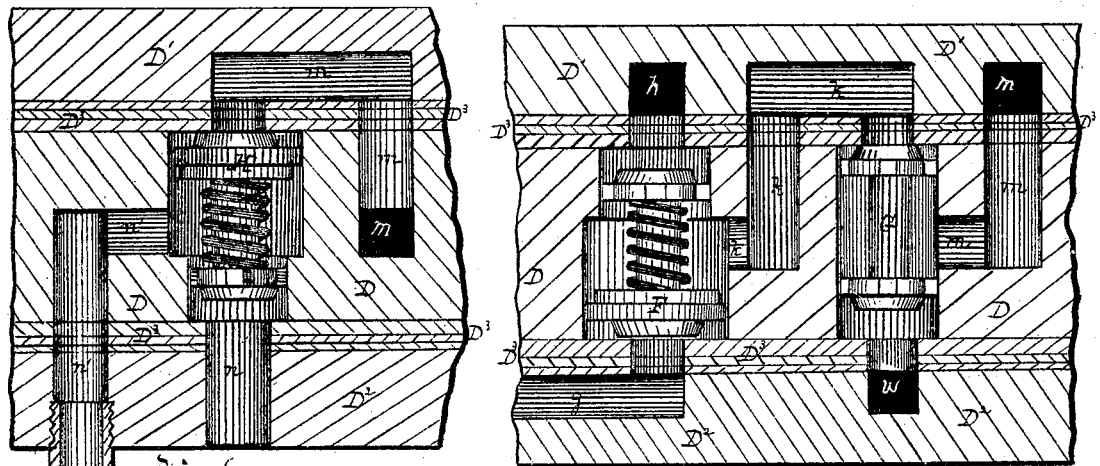
Figure 7:
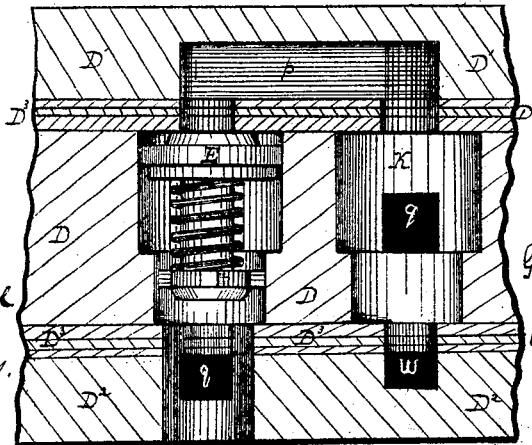

Figure 1, Sheet 1, is a top or plan view of my improvement, showing its connection with a brake-cylinder and auxiliary reservoir. Fig. 2, Sheet 1, is a side elevation of the same. Fig. 3, Sheet 2, is an enlarged horizontal section of the valve-case through the line $x$ $x$, Fig. 2. Fig. 4, Sheet 3, is a sectional view of the valve-case along the dotted line $z$ $z$, Fig. 3. Fig. 5, Sheet 3, is a like view along the line of alternate dots and dashes $z^1$ $z^1$, Fig. 3. Fig. 6, Sheet 3, is a like view along the line of dots and dashes, alternately by twos, $z^2$ $z^2$, Fig. 3. Fig. 7, Sheet 3, is a like view along the line of dashes $z^3$ $z^3$, Fig. 3. Fig. 8, Sheet 1, is a like view along the dotted line $z^4$ $z^4$, Fig. 3. Fig. 9, Sheet 2, and Fig. 10, Sheet 2, are separate detached views of the valve devices employed, as hereinafter explained.

The sectional views, when they have a general direction from left to right in Fig. 3, are looked at from below; when from top to bottom, they are looked at from the left.

Like letters of reference indicate like parts in each.

My present invention relates to sundry improvements in steam-power air-brakes for railway use. In such brakes, as heretofore commonly used, an auxiliary steam-engine, arranged on the locomotive by means of an air-pump, compresses air into a main reservoir. A pipe leads from this back under the cars, and by a branch-pipe from it to a brake-cylinder under each car. The compressed air is applied to a piston, the stem of which, directly or indirectly, actuates the ordinary brake-levers. The pipes are coupled together between the cars by couplings, the valves of which are automatic in their operation; and these couplings are arranged as described in Letters Patent granted to me August 8, 1871.

I now propose further to improve this system of railway brakes, first, by providing each car with an auxiliary reservoir, which shall be filled from the main reservoir; second, by such connections from each such auxiliary reservoir to the brake-cylinder of each car that, in case of the rupture of the main reservoir or of any of the brake-pipes, the brakes will be applied by means of compressed air from such auxiliary reservoir; third, by a double pipe-connection from the main reservoir to the brake-cylinder of each car with such intermediate connections, that either or both pipes may be in use at once for conveying compressed air, or, if either is broken at any point, communication with it will be automatically closed, and the other will perform all necessary functions; fourth, by such valve and port connections between the brake-pipes and the brake-cylinders, that one brake-pipe may, while the brakes are off and the train is running, be kept full of compressed air from the main reservoir, and so constitute, mechanically, a continuous reservoir from one end of the train to the other; fifth, by bringing this continuous reservoir-pipe into communication with the brake-cylinders at pleasure, through the agency of compressed air admitted from the main reservoir into the other brake-pipe; sixth, by such construction and arrangement of intermediate devices that, by simply discharging compressed air from this continuous reservoir-pipe, a communication will be opened from the auxiliary reservoir to the brake-cylinder, whereby the brakes will be applied; seventh, by a system of valves and ports, which shall effectuate all these results by their automatic action, except as their action is governed by the engineer at the main reservoir.

To enable others skilled in the art to make and use my improvement, I will proceed to describe its construction and mode of operation.

A, Sheet 1, represents the ordinary brake-cylinder, and A' an air-reservoir, which, to distinguish it from the main reservoir on the locomotive, I shall call the auxiliary reservoir. It is securely fastened to the under side of the car in any desired position relatively to the brake-cylinder. It may be made of any desired size and material, but should be strong enough to sustain a pressure of, say, one hundred pounds per square inch, more or less, and is preferably made somewhat larger than the brake-cylinder. B and $B^1$ are two brake-pipes, which, when coupled up, extend through the train, and are united at their ends between cars by an arrangement of couplings, described in Letters Patent granted to me August 8, 1871. Connected with each brake-cylinder by a pipe, C, (and preferably bolted thereto by means of a flange, C') is a valve-case, which is made up of the center-block, marked D, (Sheets 2 and 3,) in the ends and side edges of which are the horizontal valve-chambers $a$ $a^1$ $a^2$ $a^3$ and ports $a^4$ $a^5$ $a^6$ $a^7$, and in the body of which is made the system of ports and vertical valve-chambers, hereinafter described. It is further made up of cap and bottom plates $D^1$ $D^2$, which are bolted to the body D, and in the inner faces of which is a system of ports connecting the valve-chambers and ports of the body D with each other, and also connecting such ports with pipes leading to the brake-cylinder and to the auxiliary reservoir. Suitable packing, $D^3$, is interposed between the body D and cap and bottom plates $D^1$ $D^2$, for the usual purposes. From the pipes B $B^1$ branch-pipes $B^2$ extend to and open into the valve-chambers $a$ $a^1$, in the bottoms of which are the valve-seats $c$ $c^1$. An open port or passage, $a^4$, unites these chambers with each other. In each chamber is a valve, $b$ or $b^1$, which two valves are counterparts of each other, and both which are fixed on a common stem, $b^2$, and each of which is suitably made to seat on its seat $c$ or $c^1$. The lower or inside ends of the chambers $a$ $a^1$ are slightly enlarged, as shown, so that, when the largest part or disk $i$ of the valve comes in such enlarged part of the chamber, the air will be free to pass around and under the valve, or at least such part of it as is outside the seat $c$ or $c^1$; and when occupying that position, each valve is properly guided by means of guides $b^3$, which extend outwardly from the peripheries of the valves, and are turned down to the diameter of the unenlarged part of the valve-chamber, though other suitable guiding devices may be employed.

In Fig. 9 I have shown an inside end view of one of these valves. A series of air-ports, $c^2$, are made in it, which ports are closed at their outer ends by a flexible disk, $c^3$, Fig. 3, which is merely the ordinary form of flap-valve, though any device constituting mechanically a check-valve may be substituted therefor. Hence the air will, by an inside pressure, be caused to pass out through the air-ports $c^2$, but can pass in by an outside pressure only around the peripheries of the valves. I prefer to make the distance from end to end of these valves (exclusive of the guides) a little less than the distance from outside end to outside end of the enlarged parts of the valve-chambers $a$ $a^1$, and the distance between the seats $c$ $c^1$ a little less than the distance between the inside faces of the valves. It will then be obvious that air may be admitted to the valve-case by either valve separately, or, if the pressure is about the same at each end, by both valves at once, the action of the valves, in fact, being regulated solely by the pressure of air thereon. From the valve-chambers $a$ $a^1$, outside the valves $b$ $b^1$, air-ports $a^5$ $a^6$ lead along the side edges of the valve-case D to the opposite ends of a valve-chamber, $a^7$, in the opposite end of the valve-case. These ports pass in at the sides and out at the ends of the nuts $D^4$ $D^5$, the inner ends of which nuts, suitably packed, constitute seats for the valves $d$ $d^1$, which are fixedly attached to a common stem, $d^2$, and which are guided to and from their seats by ribs or wings on their peripheries, as shown, and also by a star-shaped guide, $d^3$, on the stem $d^2$, intermediate between the valves. Other known forms of guiding devices may be substituted. These valves have a little play to or from their seats, and either one may be open while the other is closed, or both be open at the same time. Their operation is also effected by the pressure of the air introduced from opposite directions, and also by the egress of the air. In the body part D of the valve-case I make a series of vertical valve-chambers, preferably (with one exception) of uniform size; and in each of these chambers I arrange a valve device, shown in perspective in Fig. 10. This device is really a double-ended valve, what I will call the lower valve or disk $e^1$ being smaller than the upper valve or disk $e$. Both are fastened to a common stem, $e^2$. Through the upper valve $e$ the air passes only downward, by air-ports $e^3$, the plate $e^4$, held up by a spiral or other suitable spring, $e^5$, preventing its return; but the air may pass the lower valve $e^1$ either way, this valve being smaller than its chamber, and being guided by ribs or wings $e^6$, or other equivalent guides. Four of the valve-chambers last above referred to are of proper form for the reception of one of these valve devices, as illustrated in Figs. 3 to 8, and each such valve devices, as I use them in the valve-case D, I shall designate by a single letter. In the first chamber, Figs. 3 and 4, I insert one, marked E, with the larger valve up; in the next chamber to the right I insert one, marked F, but inverted, or with the smaller valve up; also, one in the left-hand middle chamber, marked K, large valve uppermost; also, one in the lower left-hand chamber, marked H. In the lower right-hand chamber I insert a double-ended valve, marked G, the lower valve in this case being the counterpart of the upper, as more fully shown in Fig. 5. Each valve-face is provided with a raised V-shaped or other suitable form of seat, such as, when seated on the packing $D^3$, will give an air-tight joint. The ports connecting the valve-chambers are as follows: A horizontal port, $f$, extends from the chamber $a^7$, through the body D, to the chamber of the double valve E, entering the chamber between the upper and lower valves. (Figs. 3 and 4.) From the bottom of this chamber a port, $g$, extends through the bottom plate $D^2$, and opens into the bottom of the chamber occupied by the double (inverted) valve F, Figs. 4 and 5. From the top of this chamber a port, $h$, extends through the upper cap $D^1$ and downwardly and horizontally through the body D, and opens into the port or passage $a^4$, Figs. 3 and 4. From the side of the chamber last mentioned a central port, $k$, passes out and up till it enters the cap $D^1$, and thence passes along to the top of the chamber occupied by the double valve G, Figs. 3 and 5. From the side of this chamber a central port, $m$, passes out and up into the cap $D^1$, and enters the top of the chamber occupied by the double valve H, Figs. 3, 5, and 6. From the bottom of this chamber an escape-port, $n$, leads to the open air, and from the side of the same chamber a center port, $n'$, leads out and down to the outside of the valve-case, at which point it opens into the pipe C, which leads thence to the brake-cylinder A, Figs. 3 and 6. From the top of the chamber which contains the double valve E a port, $p$, extends through the cap $D^1$ to the top of a chamber occupied by the double valve K, Figs. 3 and 7, and from the side of this latter chamber a center port, $q$, leads outward and upward through the cap $D^1$, at which point it connects with the pipe $q^1$, leading to the auxiliary reservoir $A^1$, Figs. 2 and 8; also, from the bottom of the chamber last mentioned a port, $w$, leads, through the lower plate $D^2$, to the bottom of the chamber occupied by the double valve G, Figs. 7, 8, and 5. It will be remembered that the double valves E, F, H, and K are all preferably of the construction illustrated in Fig. 10, with the exception of an addition to E, which will presently be described. F is inverted, and the opposite valves of G are counterparts of each other. Through the upper valve of E a small—preferably, a very small—out-port, $s$, is made, Figs. 3 and 4, which is always open, and I usually insert therein a wire, $s^1$, of a little less diameter, the function of which is to keep the port clear of dust and dirt. This wire is supported at both ends, so that it has no endwise play, while the valve plays up and down thereon. In this way the port $s$ is kept free of dirt or other obstructions with which, on account of its minuteness, it is liable to become clogged. An opening, $v$, of reduced size, is carried down from the bottom of the chamber occupied by this valve, as shown in Fig. 4, through the lower plate $D^2$, and a valve-box, L, is secured thereto. From the lower end of a double valve E a stem, $v^1$, extends down into the valve-box L, and carries on its lower end a vertically-sliding plunger-valve, $v^2$, which, by the vertical motion which it receives from the valve E, covers and uncovers alternately the escape-port $v^3$. Any opening or leak which will permit of the escape of air when the valve $v^2$ is down will perform the same function.

I will now describe the operation of these devices; and, first, to operate the brakes with the pipe B alone, only the main reservoir on the locomotive being charged with compressed air, the engineer turns the cock, and allows the air to pass back through the pipe B. The pressure will seat the valves $b$ and $d^1$. The air will then pass along the port $f$, seat the valve E upward, which closes connection with the chamber occupied by the valve K, except through the port $s$, and raises the valve $v^2$ in the valve-box L, thus closing the port $v^3$. The air then passes around the lower valve of E, through port $g$, into the bottom of the chamber occupied by the double valve F, and seats it upward so as to close the port $h$, which leads to the passage $a^4$. The air passes upward through the lower valve of F, along the port $k$ to the top of the chamber occupied by the double valve G, seating it downward, and closing its bottom port $w$. Thence it passes around the upper valve of G, out at and along the port $m$ to the top of the chamber occupied by the double valve H, seating it downward, and closing the escape-port $n$; thence through the upper valve of H, out by the port $n'$ and pipe C, and into the brake-cylinder A, where it does its work. To let off the brakes, the engineer turns his cock so as to allow the air in the pipe B to escape. The double valve E, being thereby relieved from pressure, falls by its own weight, and the air-port $v^3$ in the valve-box L is uncovered, through which the air in the port $g$ is allowed to escape. This brings the double valve F down onto its lower seat, and opens the port $h$ from the top of its chamber to the port $a^4$. Through this port the air in the line of communication from the chamber of F to the chamber of H is allowed to escape. The air in the brake-cylinder A then passes back through the pipe C and port $n'$, and enters the chamber of H between the upper and lower valves. The upper valve being the larger, of course, the valve is lifted from its lower seat, and the air escapes at the port $n$, and the brakes are off. The air in the line of valves and ports, instead of escaping into the port $a^4$, as above indicated, may, in some instances, pass out into the chamber $a^7$ by the same path as that by which it entered.

Second, to operate the brakes by air admitted into the other line of pipe $B^1$, the operation is the same, except that the valves $b^1$ and $d$ will be seated instead of the valves $b$ and $d^1$. The operation in releasing is also the same.

In the uses of the apparatus thus far described I do not propose to charge the auxiliary reservoir $A'$. Some air will enter it through the ports, as hereinafter described; but a cock should be opened in the auxiliary reservoir, so as to allow it to escape freely.

It is obvious that air can be admitted through both pipes B $B^1$ at once, instead of only one, with like results as those already described. The position of the valves $b$ $b^1$ $d$ $d^1$ is then ascertained. Two of them must be open, and all of them may be, and some air may perhaps enter from the port $a^4$ through the port $h$.

Third, to charge the auxiliary reservoir $A'$ and operate the brakes, the cock on the auxiliary reservoir should be closed. If air be admitted by both pipes B $B^1$, the brakes will be applied, as already set forth. At the same time, a portion of the air will pass from the space between the upper and lower valves of E, through the small ports $s$, along the port $p$, into the top of the chamber occupied by the double valve K, seating it at its lower end, and closing its bottom port $w$. The air will then pass downward through the upper valve of K, out at the center port $q$, and up by the pipe $q'$ to the auxiliary reservoir A'. In the meantime the air passes along through the line of ports and valves, already described, to the brake-cylinder A, so that the brakes are applied, as already set forth. Air, under a heavy pressure, moves with such freedom that in a very short time a sufficient amount will pass through the port $s$, as above described, to charge the auxiliary reservoir A' to the same density or degree of compression as exists throughout all the air-spaces of the apparatus. The pressure on all the valves, then, above, below, and between, will be the same, and an equilibrium will exist. Immediately, then, the double valves E and F will fall by their own weight to their lower seats. The engineer turns the cock so as to allow the air to escape from either pipe B or B$^1$. The air in the port $g$ will escape at the escape-port $v^3$, whereby the double valves E and F will be held down. The air in the valve-chambers and ports intermediate between the chambers of the double valves F and H will escape at the ports $h$ and $a^4$. Then the back pressure from the brake-cylinder A will, as already described, raise the double valve H, and escape at the port $n$. It will now be observed that, the air having been allowed to escape from only one of the brake-pipes B or B$^1$, the other pipe continues full of compressed air. Such pipe then constitutes a reservoir of compressed air continuous from end to end of the train. If this pipe be the pipe B, the valves $b$ and $d^1$ will be seated so as to close communication with the other pipe B$^1$; but, if the pipe B$^1$ be used as the reservoir-pipe, the valves $b^1$ and $d$ will be seated with like effect. In either case, the port $f$ will be open to the air-pressure from such reservoir-pipe; and, as the port $s$, the valve E being seated down, as already indicated, keeps an open communication with the port $p$ and the top of the chamber occupied by the double valve K, the valve last named will be kept to its lower seat, and, consequently, the air with which the auxiliary reservoir is charged cannot escape. The brakes may then be operated at pleasure by keeping the reservoir-pipe always charged, and admitting air into and discharging it from the other pipe, the air for this purpose being taken from the main reservoir. To explain this, however, it will be necessary to recur to the construction of the valves $b$ $b^1$ and their chambers and seats. Supposing B$^1$ to be the reservoir-pipe, these valves will be seated as shown in Fig. 3, the disk $i$ occupying the unenlarged part of its chamber $a$, and the disk $i^1$ the enlarged part of its chamber $a^1$. The air will flow in around and under the valve $b^1$, so that the effective pressure exerted on this valve will be measured by the area of its lower face inside its seat, or by the area of its seat-opening $c^1$. The air being admitted from the main reservoir into the operating-pipe B, will act with an effective pressure on the full area of the disk $i$ of the other valve $b$, which disk will then become mechanically a piston to operate the valve $b^1$. Consequently, a comparatively small pressure acting on the valve $b$ will suffice to unseat the valve $b^1$, and then the air will rush in from the reservoir-pipe B$^1$ into the port $a^4$ between the valves. This movement of the valves will continue until both disks $i$ $i^1$ occupy the enlarged part each of its own chamber, and then the air will flow in from both pipes. From the port $a^4$ the air so admitted follows the port $h$ (Fig. 4) to the top of the chamber occupied by the valve F, and thence, going through the ports in the upper disk, passes by the central port $k$ (Fig. 5) and ports and chambers already indicated to the brake-cylinder. In this way I secure a store of compressed air from end to end of the train, which I am enabled to apply by the means indicated to the operation of the brakes, without having to wait to transmit the entire effective force back from the main reservoir.

Fourth, to apply the brakes in case either or both the pipes B B$^1$ become broken by accident: It is for this purpose that the auxiliary reservoir A' is chiefly provided. Suppose that B is the operating-pipe, and B$^1$ the reservoir-pipe, the former containing air at only ordinary pressure, and the latter being charged with compressed air. The valves $b^1$ and $d$ will then be seated. If the pipe B is broken by accident while the train is running, the engineer turns the cock so as to allow the air to escape from B$^1$. The pressure on the top of the double valve K is then removed, and the back pressure of air in the auxiliary reservoir, acting back through the port $q$, raises the double valve K (its upper disk being the larger) against its upper and off its lower seat. The air then passes around the lower disk of this valve, through the port $w$ (Fig. 8) to the bottom of the chamber occupied by the double valve G, (Fig. 5,) raises it to its upper seat, closing its upper port $k$, passes out at the central port $m$ and onto the brake-cylinder A by the path already described, and applies the brakes. Consequently the engineer has the same power to stop his train when his operating-pipe becomes broken as before. And if his reservoir-pipe B$^1$ becomes broken by accident, the escape of the air therefrom brings the valve K into operation as before, and the brakes are applied without the intervention of the engineer; and in this case it is immaterial which pipe is used as an operating and which as a reservoir pipe. The operation described under this fourth head is designed simply for safety, in order that, in case of an accident to the brake-pipes, or either of them, the train may be stopped and damages repaired. To let off the brakes in this case, the cock on the auxiliary reservoir will have to be opened, and the air will then escape from the brake-cylinder, as already set forth. If repairs cannot be made at once, this cock can be left open and the brakes be operated by the unbroken line of pipe, as indicated under first and second heads. If a car leaves the track, or otherwise becomes disconnected from the rest of the train, I employ other additional apparatus to secure the admission of air from the reservoir-pipe or auxiliary reservoir, or both, to the brake-cylinder; but this will constitute the subject-matter of a separate application. It is obvious that, with a suitable pumping apparatus to each car, what I have described as an auxiliary reservoir may, one to each car, be a substitute for the main reservoir, heretofore arranged on the locomotive or tender; but this feature will be included in the subject-matter of a separate application. Various modifications may be made in the apparatus described without departing from the scope of my invention. As by it several independent functions are performed, the devices necessary for accomplishing one or more of these functions may be omitted, and modifications be introduced, such as will suggest themselves to the skilled mechanic, to adapt the remaining devices to perform the other functions. If a light spring be arranged above the double valve F, or other device be introduced suitable for seating such valve on its lower seat when an equilibrium of pressure is established, the port $v$, (which by the port $g$ communicates with the chamber of F,) under the double valve E, may be dispensed with, as also the valve and valve-box below it. I prefer to have the upper disks of the double valves E and K work somewhat loosely in their respective chambers; so loosely, in fact, that they will, when not under a contrary pressure, fall to their lower seats by their own weight. In that case a little air will leak up around the upper disk of the valve E, when it is seated downward, in addition to what passes through the port $s$; but this will not be a source of objection. The rubber disks $c^3$ on the valves $b$ $b^1$ may be omitted, if so preferred, and the braking be done by the operating brake-pipe in the usual way. Also, the plate $e^4$, spring $e^5$, and ports $e^3$, shown in Fig. 10, may be omitted in the construction of the double valves D and K without interfering with their operation; and the double valve F may be made like the double valve G—that is, with the upper and lower disks of like size and construction—though the form and construction described is preferable. The advantage in making the double valves E, F, H, and K exactly alike is chiefly an advantage in manufacturing, and in being able to use a valve of such construction in any one of the chambers indicated.

The double brake-pipe B B$^1$ may be employed simply for ordinary braking, with a connecting-pipe from one to the other, and a double-ended valve in such connecting-pipe, and with an air-port or opening from between the valves to the brake-cylinder.

It is also obvious that, when one of the brake-pipes B or B$^1$ is used as a reservoir-pipe, various devices may be employed to open at the desired instant a communication from such reservoir-pipe to each of the brake-cylinders.

While I have described what I believe to be the best means, I do not wish to be understood as limiting myself in the use of the reservoir-pipe to that as the only means.

The element of construction on which the devices described largely depend for their success is the combination of a double-ended or double-disked valve with two end ports and one central port. It will be noticed that in the apparatus described each such valve is combined with such an arrangement of ports; also, that in every case the valve seats outward to close its end port, except with the valves $b$ $b^1$, which seat inward. While it is better to charge the auxiliary reservoir and the reservoir-pipe directly from the main reservoir, this is not essential, since either or both may be connected directly to the cylinder of the air-pump, and be charged therefrom.

In the foregoing description I have spoken of air escaping, air being admitted, &c.; I do not mean to imply that, in the former case, a vacuum will be formed, nor in the latter case that a vacuum exists; but use these and other like terms with reference to compressed air, air in that condition being what is required in the class of atmospheric brakes under consideration.

What I claim as my invention, and desire to secure by Letters Patent, is—

1. An air-reservoir for receiving and retaining compressed air until required for use, arranged under or in connection with each car, which reservoir shall be auxiliary to the main reservoir on or near the locomotive, and receive its charge from the main reservoir, or more directly from the cylinder of the air-pump, substantially as described.

2. A pair of brake-pipes running from end to end of each car, with connections, substantially as described; thence to the brake-cylinder, whereby both pipes may be used at once for braking purposes, or either separately, or one only, in case of accident to the other.

3. A brake-pipe, fitted up for use as an air-reservoir for keeping a supply of air compressed to the desired density, on each of the cars of a train, and also fitted with suitable devices for admitting air when wanted, and only when wanted, therefrom to the brake-cylinders, substantially as set forth.

4. In combination with a reservoir-pipe, B or B$^1$, an operating-pipe, B$^1$ or B, and a pipe-connection between the two, such connection having a double-ended valve, or a valve and piston of unequal areas, exposed to an effective pressure, whereby a comparatively moderate pressure of air from the operating-pipe on the piston or on the valve of larger exposed area will unseat the other valve and admit compressed air from the reservoir-pipe, substantially as set forth.

5. A reservoir-pipe and an auxiliary reservoir, both suitably arranged to be charged with compressed air, communicating with each other by a port or ports, and with a double-ended valve, K, suitably arranged in such line of communication, whereby, while the pressure is kept up in the reservoir-pipe, the same degree of pressure will be preserved in the auxiliary reservoir, and on lowering of the pressure in the reservoir-pipe by accident or otherwise a port, $w$, will be thereby opened from the auxiliary reservoir directly or indirectly to the brake-cylinder, substantially as described.

6. The valves $b$ $b^1$ affixed to a single stem, in combination with the valve-chambers $a$ $a^1$, and constructed, substantially as set forth, so that when either one is seated the other will present, subject to effective pressure, an area larger than the pressure-area of the seated valve, whereby either brake-pipe B or $B^1$ may at pleasure be used as a reservoir-pipe.

7. An air-port, $s$, leading at any suitable point from the line of communication between the brake or reservoir pipe and the brake-cylinder directly or indirectly to an auxiliary reservoir, such port being always open for the supply of air to the auxiliary reservoir, substantially as set forth.

8. The arrangement of a wire, $s'$, in the port $s$, such wire being less in size than the port, for keeping the port clear by the play of the valve thereon, substantially as set forth.

9. The double-ended valve K, in combination with the auxiliary reservoir $A'$, substantially as described.

10. The double-ended valve F, provided with a relief-port, $v^3$, communicating therewith, or other device for forcing said valve to its lower seat when not subject to an air-pressure, or when subject to an equilibrium of forces, substantially as set forth.

11. A double-ended valve, G, arranged in a chamber which has a top port, $k$, and central port $m$ in the line of communication from the brake-pipes to the brake-cylinder, and a bottom port, $w$, for the inflow of air from the auxiliary reservoir, the movement of the valve closing and opening such top and bottom ports, substantially as described.

12. The system of ports $a^4$ $a^5$ $a^6$ $a^7$ and valves $b$ $b^1$ $d$ $d^1$, arranged substantially as described, and for the purposes set forth.

13. The double-ended valve E, arranged in a valve-chamber, which has a bottom port, $g$, leading directly or indirectly to a brake-cylinder, and a top port, $p$, leading directly or indirectly to an auxiliary reservoir, and operative therein, substantially as set forth.

14. The double-ended valve F, arranged in a chamber which has a bottom port, $g$, a central port, $k$, in the line of communication from the brake-pipes to the brake-cylinder, and a top port, $h$, which leads to the port $a^4$, and operative in opening and closing such top and bottom ports, substantially as and for the purposes set forth.

15. A system of double-ended valves E, F, G, H, and K, and ports connecting the chambers of such valves with each other and with the brake-pipes, brake-cylinder, and auxiliary reservoir, and operative by air-pressure, substantially as set forth.

16. A double-ended valve, the opposite outer faces of whose disks are opposite to and alternately close a pair of inlet-ports, with a chamber or passage connecting such end ports, in combination with a lateral port intermediate between the valves, and leading therefrom, substantially as set forth.

17. A double-ended valve, $b$ $b^1$, each seated on its inner face, in combination with a communicating-passage, $a^4$, and a lateral port, $h$, substantially as described.

In testimony whereof I, the said GEORGE WESTINGHOUSE, Jr., have hereunto set my hand.

GEO. WESTINGHOUSE, JR.

Witnesses:
JOHN H. JOHNSON,
G. H. CHRISTY.